US011939717B2

(12) United States Patent
Flynn

(10) Patent No.: US 11,939,717 B2
(45) Date of Patent: Mar. 26, 2024

(54) HINGE ASSEMBLY FOR AN APPLIANCE

(71) Applicant: Haier US Appliance Solutions, Inc., Wilmington, DE (US)

(72) Inventor: Rebecca Raynell Flynn, Georgetown, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 357 days.

(21) Appl. No.: 17/237,186

(22) Filed: Apr. 22, 2021

(65) Prior Publication Data

US 2022/0341231 A1 Oct. 27, 2022

(51) Int. Cl.
*D06F 39/14* (2006.01)
*D06F 34/28* (2020.01)
*E05D 3/02* (2006.01)

(52) U.S. Cl.
CPC .............. *D06F 39/14* (2013.01); *D06F 34/28* (2020.02); *E05D 3/02* (2013.01); *E05Y 2900/312* (2013.01)

(58) Field of Classification Search
CPC .......... D06F 39/14; D06F 37/10; D06F 37/28; D06F 34/28; E05Y 2900/312; E05Y 2201/266; F25D 23/04; E05D 11/06; E05D 3/02
See application file for complete search history.

(56) References Cited

U.S. PATENT DOCUMENTS 3,921,254 A * 11/1975 Foster, Jr. ............. E05D 7/1022 16/259
3,952,369 A * 4/1976 Erickson ................. D06F 39/14 16/265
4,115,901 A 9/1978 Schmidt
4,787,121 A 11/1988 Coates
4,914,781 A * 4/1990 Sokn ..................... E05D 11/082 16/280
6,513,196 B2 2/2003 Reynolds
7,513,131 B2 4/2009 Kim
8,297,085 B2 10/2012 Jongdeuk
(Continued)

FOREIGN PATENT DOCUMENTS

AU 2010206038 B2 11/2011
AU 2010206049 B2 6/2012
(Continued)

*Primary Examiner* — Hiwot E Tefera
(74) *Attorney, Agent, or Firm* — Dority & Manning, P.A.

(57) ABSTRACT

An appliance includes a cabinet defining at least one chamber accessible via an opening. The appliance also includes a cover member movable between an open position and a closed position for providing selective access to the opening. The appliance includes a hinge assembly constructed of a polymer material and operably coupled to the cover member. The hinge assembly includes first and second hinge members. The first hinge member is fixedly secured to the cabinet. The second hinge member includes a base portion fixedly secured to cover member and a pin portion. The pin portion is rotatably secured to the first hinge member to move the cover member between the open and closed positions. In the open position, the first and second hinge members cooperatively engage together to restrict movement of the cover member in the open position. In the closed position, the cabinet restricts movement of the cover member.

14 Claims, 11 Drawing Sheets

(56) References Cited

U.S. PATENT DOCUMENTS

| | | | | |
|---|---|---|---|---|
| 8,444,234 | B2 | 5/2013 | Jongdeuk | |
| 8,511,115 | B2 | 8/2013 | Jongdeuk | |
| 8,555,465 | B2 * | 10/2013 | Novin | E05D 11/082 16/342 |
| 8,763,431 | B2 | 7/2014 | Kichul | |
| 9,290,880 | B2 | 3/2016 | Yongjun | |
| 10,175,730 | B2 * | 1/2019 | Lin | G06F 1/1681 |
| 10,704,177 | B2 * | 7/2020 | Mora | D06F 39/14 |
| 10,890,023 | B2 * | 1/2021 | Mccafferty | E05D 7/14 |
| 11,479,903 | B2 * | 10/2022 | Kim | D06F 39/125 |
| 11,697,956 | B1 * | 7/2023 | Cheng | E05D 5/02 16/337 |
| 2011/0050059 | A1 | 3/2011 | Jongdeuk | |
| 2011/0050060 | A1 | 3/2011 | Jongdeuk | |
| 2011/0062837 | A1 | 3/2011 | Kichul | |
| 2011/0089793 | A1 | 4/2011 | Jongdeuk | |
| 2011/0121694 | A1 | 5/2011 | Jongdeuk | |
| 2012/0192380 | A1 * | 8/2012 | Huang | D06F 39/14 16/319 |
| 2013/0193823 | A1 | 8/2013 | Sanghun | |
| 2014/0009049 | A1 | 1/2014 | Sang | |
| 2018/0266156 | A1 * | 9/2018 | Mora | E06B 3/38 |
| 2019/0040665 | A1 * | 2/2019 | Jean | E05D 11/082 |
| 2021/0198835 | A1 * | 7/2021 | Jeffery | D06F 39/14 |
| 2022/0228311 | A1 * | 7/2022 | Mora | D06F 39/14 |

FOREIGN PATENT DOCUMENTS

| | | | |
|---|---|---|---|
| BR | PI1002652 | A2 | 3/2012 |
| CA | 2711348 | A1 | 1/2011 |
| CA | 2711295 | C | 2/2013 |
| CN | 1965140 | A | 5/2007 |
| CN | 101988253 | A | 3/2011 |
| CN | 101988254 | A | 3/2011 |
| CN | 101988254 | B | 1/2013 |
| CN | 102978878 | A | 3/2013 |
| CN | 101988253 | B | 11/2013 |
| CN | 102978878 | B | 6/2015 |
| EP | 1753926 | A1 | 2/2007 |
| RU | 2006143411 | A | 7/2008 |
| RU | 2368749 | C2 | 9/2009 |
| RU | 2010132189 | A | 2/2012 |
| RU | 2448208 | C1 | 4/2012 |
| WO | WO2005118995 | A1 | 12/2005 |
| WO | WO2016157720 | A1 | 10/2016 |

* cited by examiner

HINGE ASSEMBLY FOR AN APPLIANCE

FIELD OF THE INVENTION

The present subject matter relates generally to appliances and more particularly to a hinge assembly for a cover member, such as a lid, of an appliance.

BACKGROUND OF THE INVENTION

Washing machine appliances generally include a tub for containing wash fluid, e.g., water, detergent, and/or bleach. A basket is rotatably mounted within the tub and defines a wash chamber for receipt of articles for washing. During operation of such washing machine appliances, wash fluid is directed into the tub and onto articles within the wash chamber of the basket. The basket can rotate at various speeds to agitate articles within the wash chamber in the wash fluid, to wring wash fluid from articles within the wash chamber, etc. For example, during operation of certain washing machine appliances, a spin cycle is performed to wring wash fluid from the articles within the wash chamber. The spin cycle typically entails rotating the basket at a relatively high rate of speed for a period of time. Typically, and desirably, the tub is generally empty of wash fluid and suds (caused by interaction between water and detergent, etc.). Washing machine appliances also typically include a top lid (or front door) for securing the articles within the wash chamber and for preventing the articles, as well as the water and detergent, from exiting the wash chamber during operation. Such appliances may also include various other compartments or chambers having various rigid doors or lids for providing selective access thereto.

Existing washing machine appliances have a metal wire form hinge for rotating the top lid between open and closed positions. However, existing designs collide with the backsplash and/or backsplash controls of the appliance.

Accordingly, the art is continuously seeking new and improved washing machine appliances that address the aforementioned issues. Thus, the present disclosure is directed to an appliance, such as a washing machine appliance, having an improved hinge assembly for the top lid to prevent the lid from interfering with the backsplash and/or backsplash controls thereof.

BRIEF DESCRIPTION OF THE INVENTION

Aspects and advantages of the invention will be set forth in part in the following description, or may be obvious from the description, or may be learned through practice of the invention.

In one aspect, the present disclosure is directed to an appliance. The appliance includes a cabinet defining at least one chamber accessible via an opening. The appliance also includes a cover member movable between an open position and a closed position for providing selective access to the opening. Further, the appliance includes a hinge assembly constructed of a polymer material and operably coupled to the cover member. The hinge assembly includes a first hinge member and a second hinge member rotatable with respect to the first hinge member. The first hinge member is fixedly secured to the cabinet. The second hinge member includes a base portion and a pin portion. The base portion is fixedly secured to cover member. The pin portion is rotatably secured to the first hinge member to move the cover member between the open position and the closed position. As such, in the open position, the first and second hinge members cooperatively engage together to restrict movement of the cover member in the open position. Further, in the closed position, the cabinet restricts movement of the cover member.

In another aspect, the present disclosure is directed to a washing machine appliance. The washing machine appliance includes a tub and basket rotatably mounted within the tub. The basket includes a cabinet defining at least one chamber accessible via an opening for receipt of articles for washing. Further, the washing machine appliance includes a cover member movable between an open position and a closed position for providing selective access to the opening. Moreover, the washing machine appliance includes a hinge assembly constructed of a polymer material and operably coupled to the cover member. The hinge assembly includes a first hinge member and a second hinge member rotatable with respect to the first hinge member. The first hinge member is fixedly secured to the cabinet. The second hinge member includes a base portion and a pin portion. The base portion is fixedly secured to cover member. The pin portion is rotatably secured to the first hinge member to move the cover member between the open position and the closed position. As such, in the open position, the first and second hinge members cooperatively engage together to restrict movement of the cover member in the open position. Further, in the closed position, the cabinet restricts movement of the cover member.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
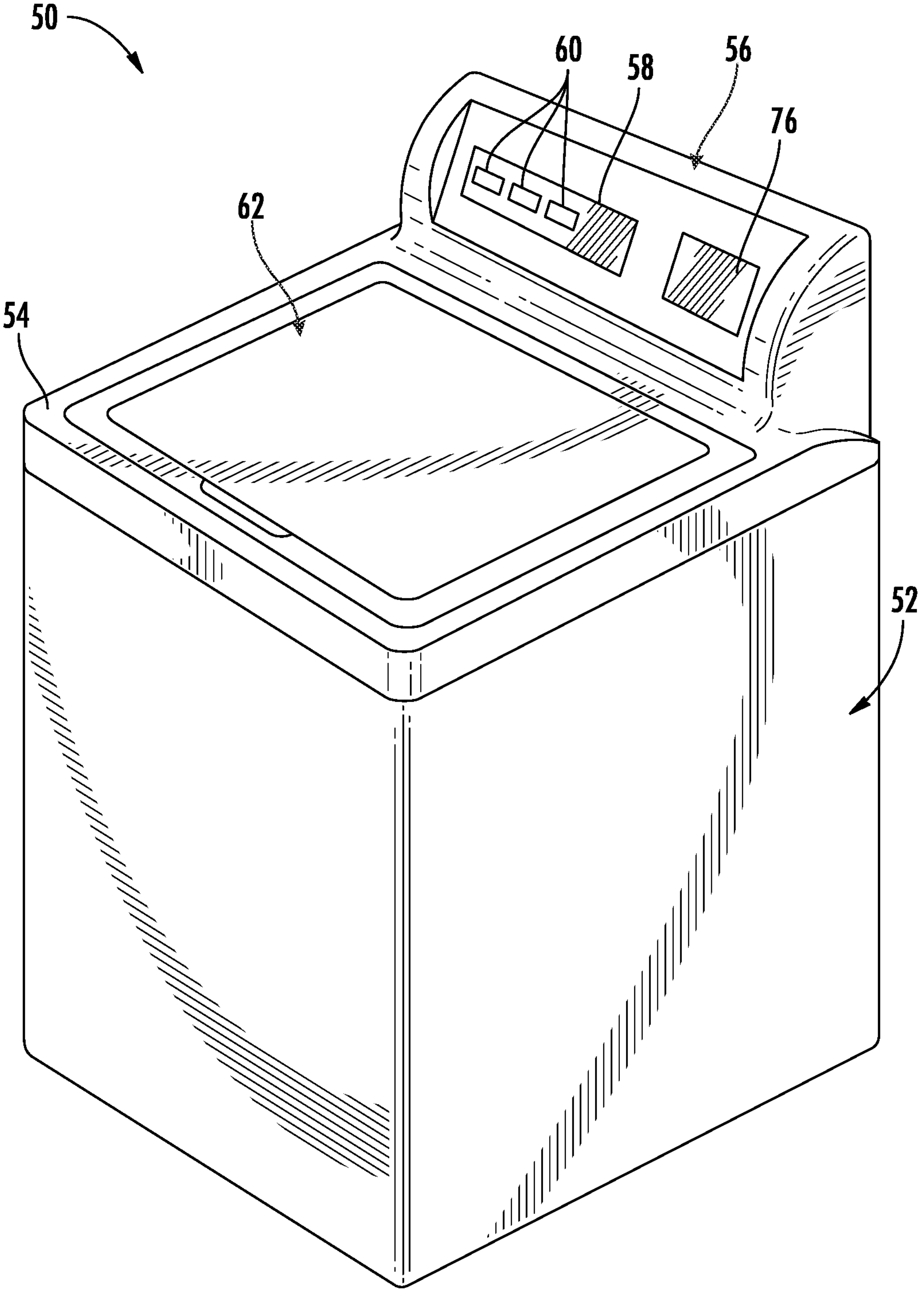
FIG. 1 provides a perspective view of a washing machine appliance according to an embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of an appliance 50 according to an embodiment of the present disclosure. More specifically, as shown, the appliance 50 is a washing machine appliance 50. It should be understood by those having ordinary skill in the art that the washing machine appliance 50 is provided for illustrative purposes only and still further types of appliances are within the spirit and scope of the invention. For example, in another embodiment, the appliance may be a dryer appliance.

As shown in FIG. 1, the washing machine appliance 50 includes a cabinet 52 and a cover 54. A backsplash 56 extends from the cover 54, and a control panel 58 including a plurality of input selectors 60 is coupled to backsplash 56. The control panel 58 and input selectors 60 collectively form a user interface input for operator selection of machine cycles and features, and in one embodiment, a display 76 indicates selected features, a countdown timer, and/or other items of interest to machine users. A lid 62 is mounted to the cover 54 and is rotatable between an open position (not shown) facilitating access to a wash tub 64 (FIG. 2) located within the cabinet 52 and a closed position (shown in FIG. 1) forming an enclosure over the tub 64.

Figure 2:
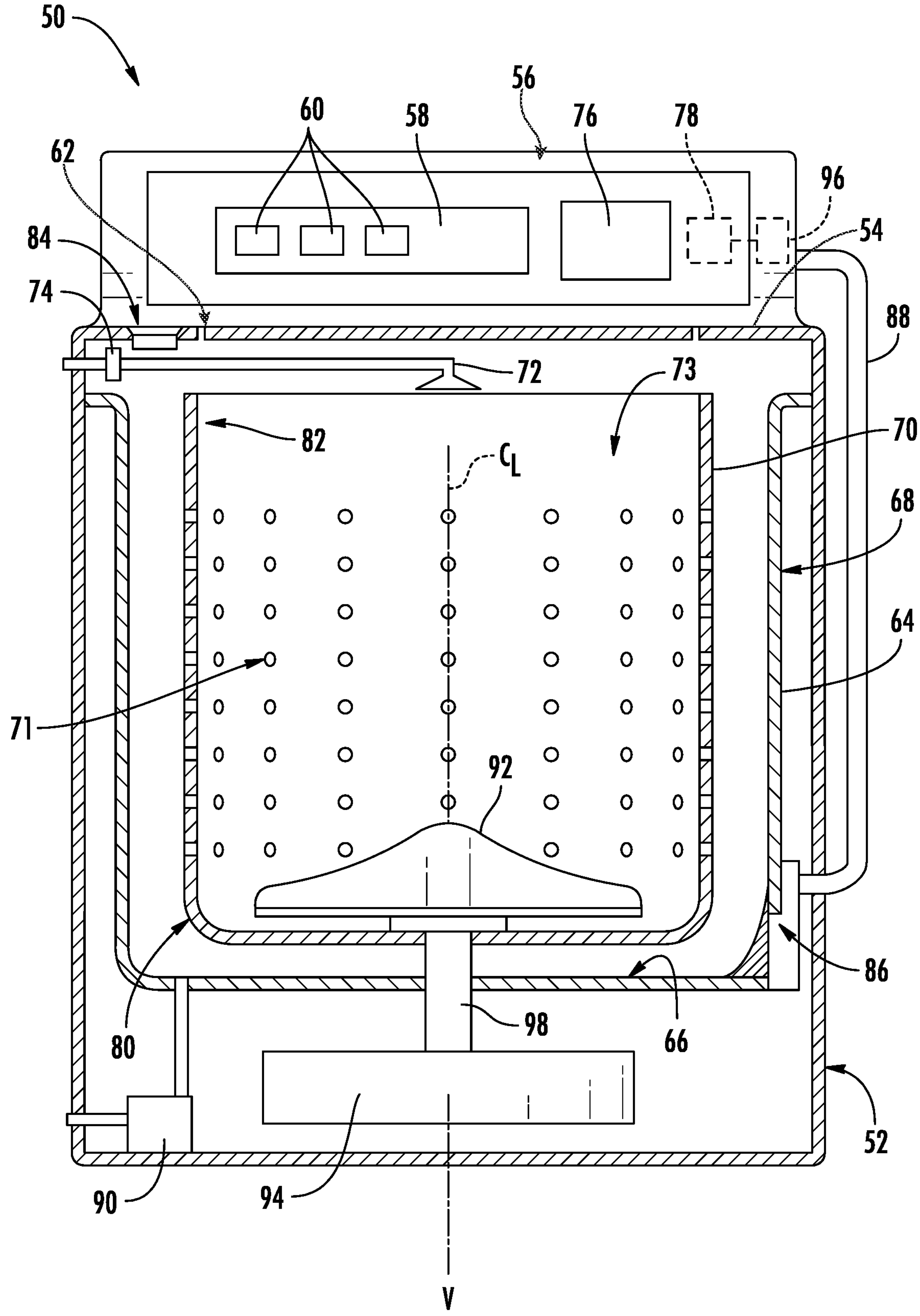
FIG. 2 provides a front, cross-sectional view of the washing machine appliance of FIG. 1.
Figure 3:
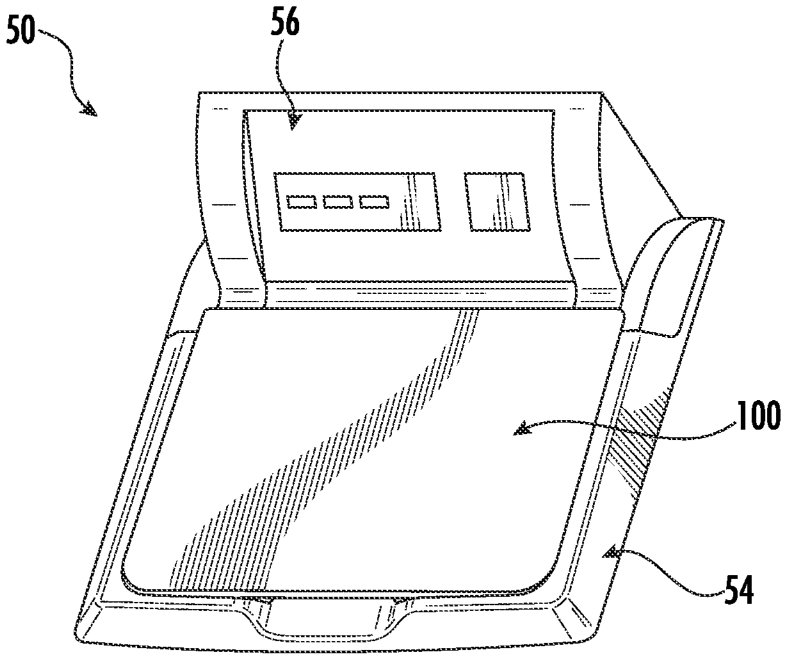
FIG. 3 provides a top, perspective view of an embodiment of a washing machine appliance according to the present disclosure, particularly illustrating a cover member of the appliance in a closed position.

Referring now to FIG. 2, a front, cross-sectional view of the washing machine appliance 50 is illustrated. As may be seen in FIG. 2, the tub 64 includes a bottom wall 66 and a sidewall 68. A wash basket 70 or drum is rotatably mounted within the tub 64. In exemplary embodiments as shown, the basket 70 is rotatable about a vertical axis V. Thus, the washing machine appliance 50 in these embodiments is generally referred to as a vertical axis washing machine appliance. Further, as shown, the basket 70 defines a wash chamber 73 for receipt of articles for washing and extends, e.g., vertically, between a bottom portion 80 and a top portion 82. The basket 70 includes a plurality of openings or perforations 71 therein to facilitate fluid communication between an interior of the basket 70 and the tub 64.

A spout 72 is configured for directing a flow of fluid into the tub 64. In particular, the spout 72 may be positioned at or adjacent to the top portion 82 of the basket 70. The spout 72 may be in fluid communication with a water supply (not shown) in order to direct fluid (e.g., liquid water) into the tub 64 and/or onto articles within the chamber 73 of the basket 70. A valve 74 regulates the flow of fluid through the spout 72. For example, the valve 74 can selectively adjust to a closed position in order to terminate or obstruct the flow of fluid through the spout 72. A pump assembly 90 (shown schematically in FIG. 2) is located beneath the tub 64 and the basket 70 for gravity assisted flow to drain the tub 64.

Still referring to FIG. 2, an agitation element 92, shown as an impeller in FIG. 2, is disposed in the basket 70 to impart an oscillatory motion to articles and liquid in the chamber 73 of the basket 70. In various embodiments, the agitation element 92 includes a single action element (i.e., oscillatory only), double action (oscillatory movement at one end, single direction rotation at the other end) or triple action (oscillatory movement plus single direction rotation at one end, singe direction rotation at the other end). As illustrated in FIG. 2, the agitation element 92 is oriented to rotate about vertical axis V. The basket 70 and the agitation element 92 are driven by a pancake motor 94. Thus, as a motor output shaft 98 is rotated, the basket 70 and the agitation element 92 are operated for rotatable movement within the tub 64, e.g., about vertical axis V. Further, the washing machine appliance 50 may also include a brake assembly (not shown) selectively applied or released for respectively maintaining the basket 70 in a stationary position within the tub 64 or for allowing the basket 70 to spin within the tub 64.

Operation of the washing machine appliance 50 is controlled by a processing device or controller 78, that is operatively coupled to the user interface input located on washing machine backsplash 56 (shown in FIG. 1) for user manipulation to select washing machine cycles and features. As such, in response to user manipulation of the user interface input, the controller 78 operates the various components of the washing machine appliance 50 to execute selected machine cycles and features.

The controller 78 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 78 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 58 and other components of washing machine appliance 50 may be in communication with controller 78 via one or more signal lines or shared communication busses.

In an illustrative embodiment, laundry items are loaded into the chamber 73 of the basket 70, and washing operation is initiated through operator manipulation of control input selectors 60. The tub 64 is filled with water and mixed with detergent to form a wash fluid. The valve 74 can be opened to initiate a flow of water into the tub 64 via the spout 72, and the tub 64 can be filled to the appropriate level for the number of articles being washed. In certain embodiments, the detergent may be poured directly into the basket 70 via a user. In alternative embodiments, the washing machine appliance 50 may be further equipped with a detergent dispenser 84 (FIG. 2) in which the detergent may be poured. In certain embodiments, as an example, the dispenser 84 may be a smart dispenser than can be controlled via the controller 78 as further described herein. Once the tub 64 is properly filled with wash fluid, the contents of the basket 70 are agitated with the agitation element 92 for cleaning of laundry items in the basket 70. More specifically, the agitation element 92 is moved back and forth in an oscillatory motion.

After the agitation phase of the wash cycle is completed, the tub 64 is drained. Laundry articles can then be rinsed by again adding fluid to the tub 64, depending on the particulars of the cleaning cycle selected by a user, the agitation element 92 may again provide agitation within the basket 70. One or more spin cycles may also be used. In particular, a spin cycle may be applied after the wash cycle and/or after the rinse cycle in order to wring wash fluid from the articles being washed. During a spin cycle, the basket 70 is rotated at relatively high speeds.

While described in the context of a specific embodiment of the washing machine appliance 50, using the teachings disclosed herein it will be understood that the washing machine appliance 50 is provided by way of example only. Other washing machine appliances having different configurations (such as horizontal-axis washing machine appliances), different appearances, and/or different features may also be utilized with the present subject matter as well.

Referring still to FIG. 2, a pressure chamber 86 may be defined in the tub 64. The pressure chamber 86 may be provided for facilitating tub pressure measurements. For example, a hose 88 may connect the pressure chamber 86 to a pressure sensor 96. The pressure sensor 96 may measure the pressure in the pressure chamber 86 or at another suitable location within the tub 64, and may be in operative communication with the controller 78. The pressure sensor 96 may be a component of the controller 78, or may be a separate component from the controller 78 which is in communication with the controller 78 through a suitable wired or wireless connection. The pressure sensor 96 may, for example, be an analog pressure sensor, a digital pressure sensor, a mechanical pressure switch, or any other suitable device capable of measuring pressure as required herein.

Referring now to FIGS. 3-18, various embodiments of a cover member 100 for an appliance, such as washing machine appliance 50, having a unique hinge assembly 102 according to the present disclosure are illustrated. In particular, as shown in FIGS. 3, 4, 8, 9, and 11, the cover member 100 can be used in place of the lid 62. Thus, in the illustrated embodiments, the cover member 100 is configured to provide selective access to the wash chamber 73 by exposing an opening 103 of the wash chamber 73. More particularly, as shown, the cover member 100 is movable between a closed position (FIGS. 3-7) that covers the opening 103 and an open position (FIGS. 8-11) that exposes the opening 103.

Figure 4:
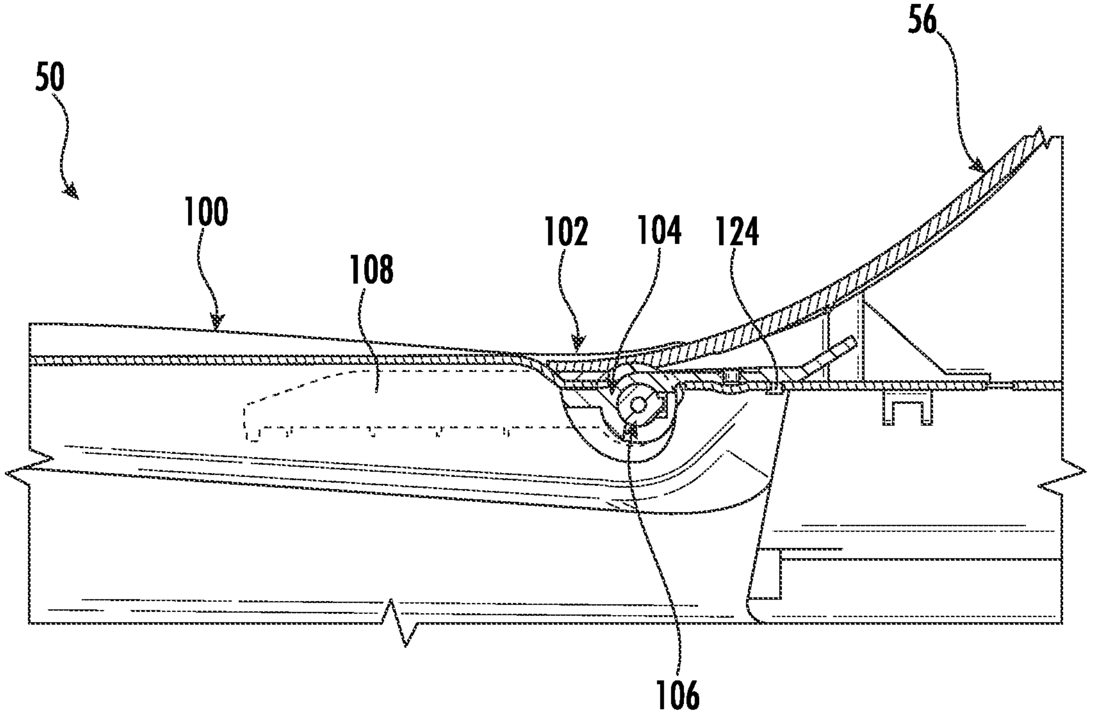
FIG. 4 provides a side, cross-sectional view of one embodiment of a portion of a washing machine appliance according to the present disclosure, particularly illustrating a hinge assembly of a cover member of the appliance in a closed position.
Figure 5:
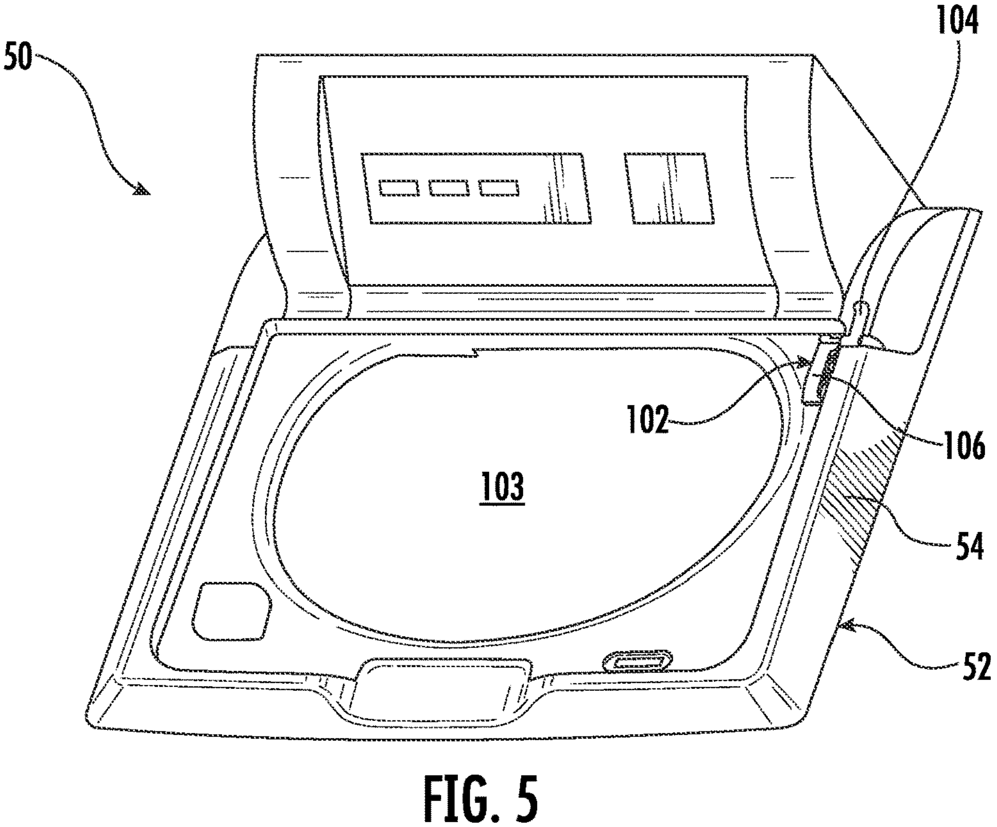
FIG. 5 provides a top, perspective view of the washing machine appliance of FIG. 3 with the cover member removed to further illustrate components of the hinge assembly of the appliance in a closed position.
Figure 6:
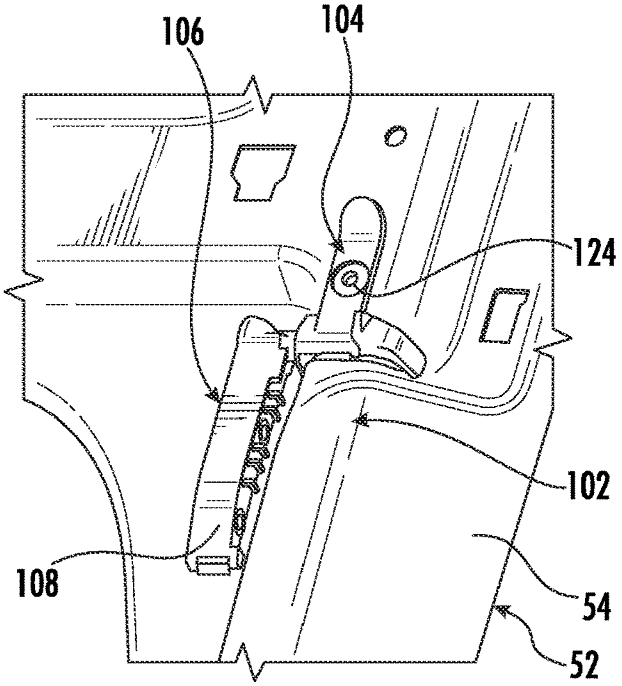
FIG. 6 provides a detailed view of the hinge assembly of the appliance of FIG. 5.
Figure 7:
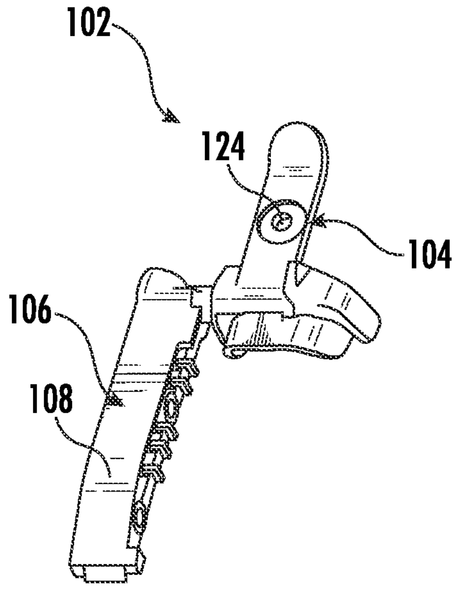
FIG. 7 provides a perspective view of one embodiment of a hinge assembly of a washing machine appliance in a closed position according to the present disclosure.
Figure 8:
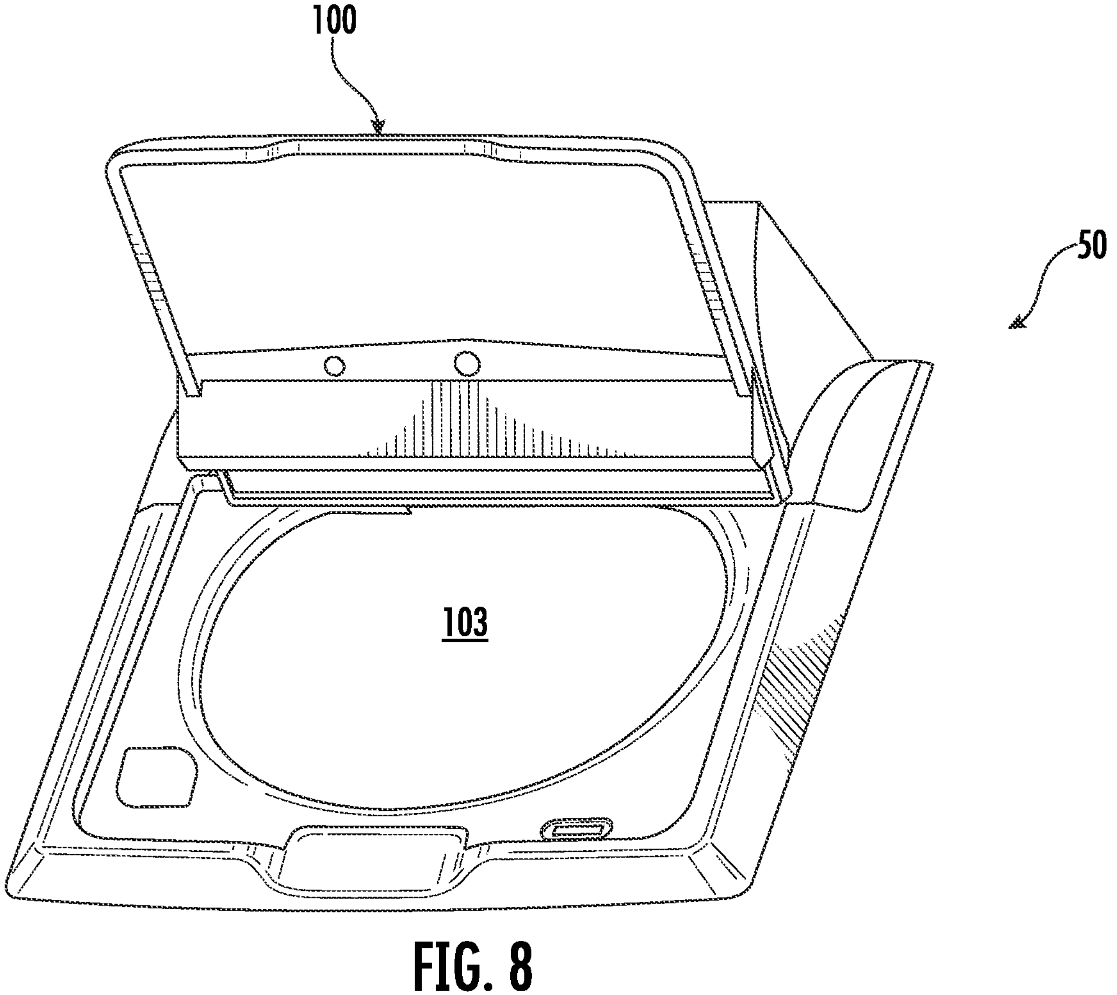
FIG. 8 provides a top, perspective view of a portion of a washing machine appliance according to the present disclosure, particularly illustrating a hinge assembly of a cover member of the appliance in an open position.
Figure 9:
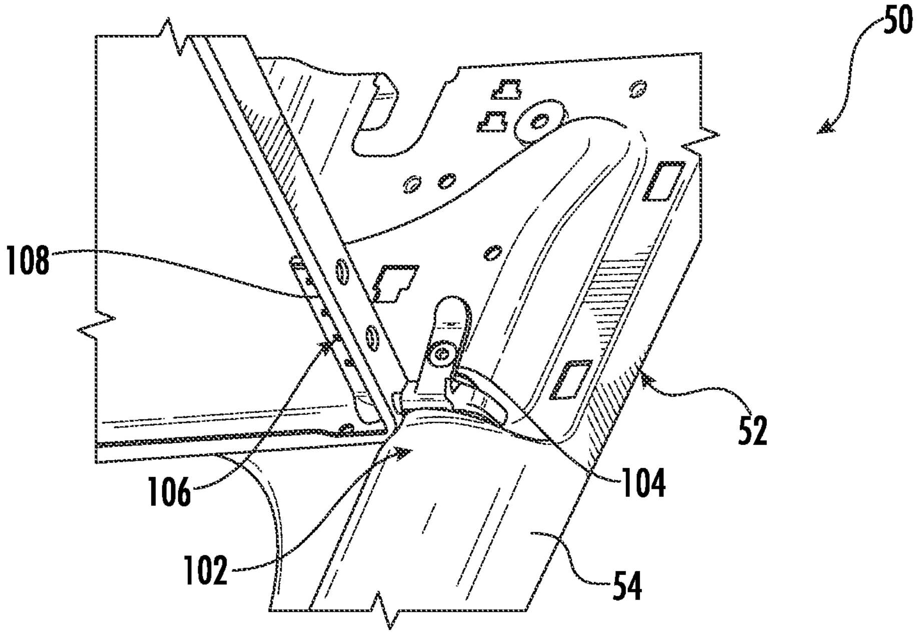
FIG. 9 provides a detailed view of the hinge assembly of the appliance of FIG. 8 with certain components removed to further illustrate details of the hinge assembly in the open position.
Figure 10:
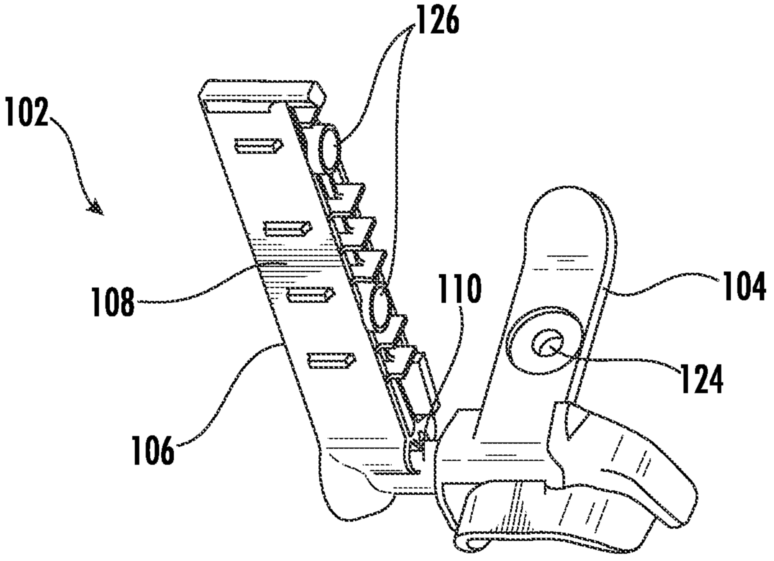
FIG. 10 provides a perspective view of one embodiment of a hinge assembly of a washing machine appliance in an open position according to the present disclosure.
Figure 11:
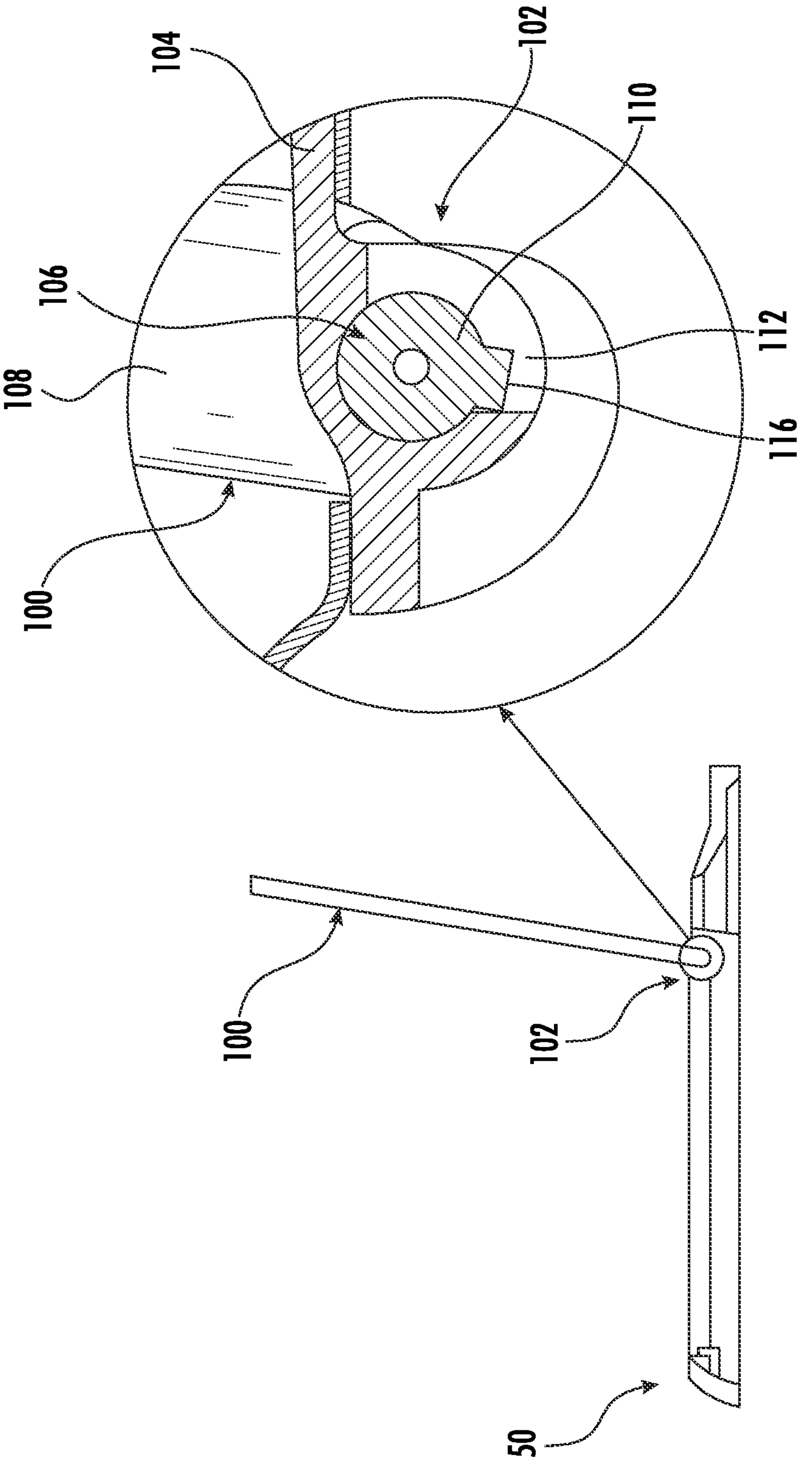
FIG. 11 provides a side view and a detailed view of one embodiment of a hinge assembly of a washing machine appliance in an open position according to the present disclosure.
Figure 12:
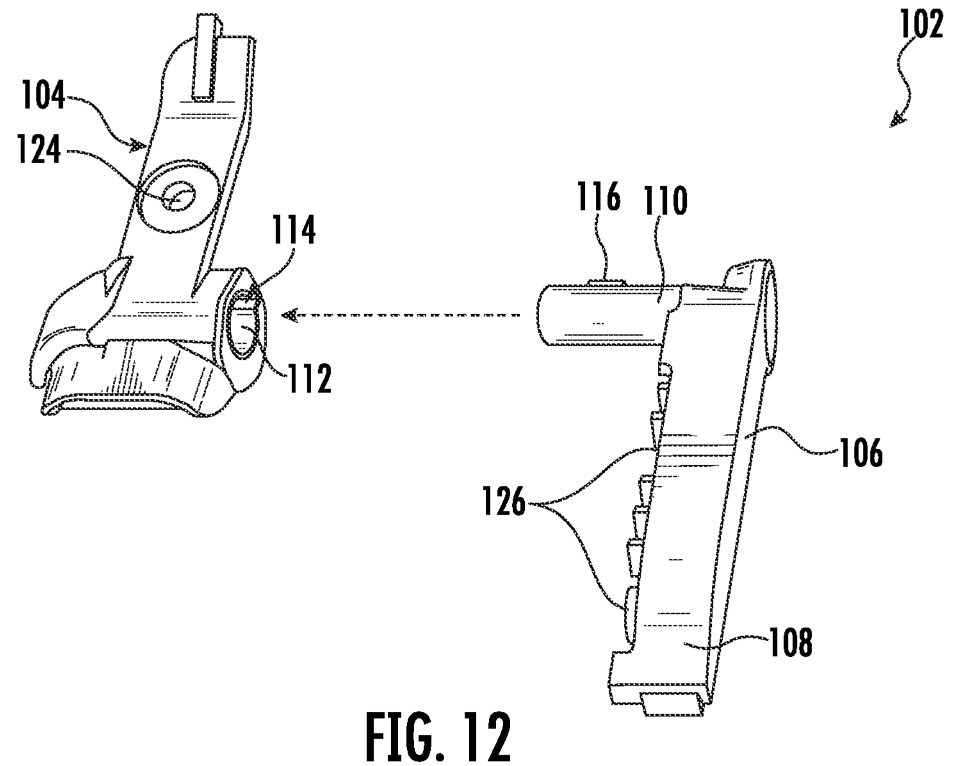
FIG. 12 provides an exploded view of one embodiment of a hinge assembly of a washing machine appliance in an open position according to the present disclosure.
Figure 13:
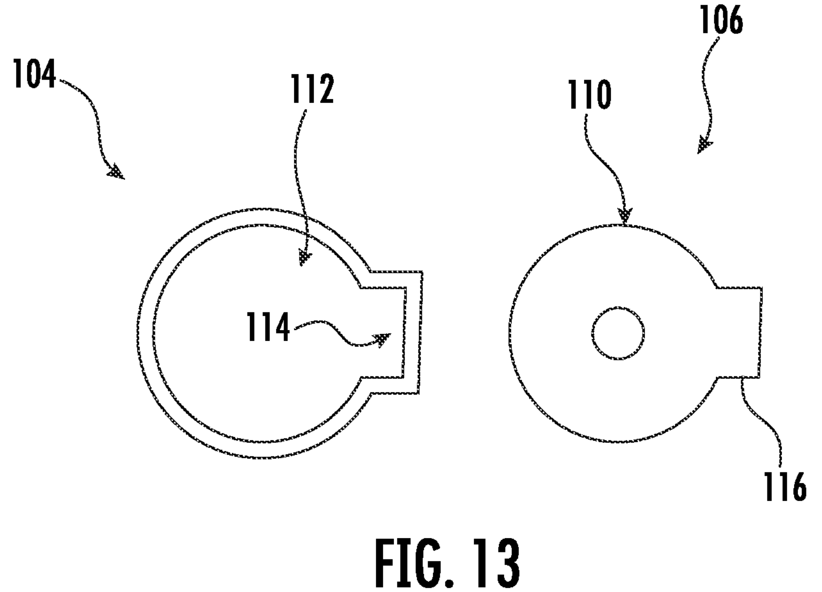
FIG. 13 provides cross-sectional views of a recess and a pin portion of one embodiment of a hinge assembly of a washing machine appliance according to the present disclosure.

Further, as shown in FIGS. 3-18, the washing machine appliance 50 includes a hinge assembly 102 constructed of a polymer material, such as plastic. Moreover, as shown and further described herein, the hinge assembly 102 is operably coupled to the cover member 100 to allow for the opening and closing of the cover member 100. More particularly, as shown in FIGS. 4-7 and 9-16, the hinge assembly 102 includes a first hinge member 104 and a second hinge member 106 rotatable with respect to the first hinge member 104. Further, as shown in FIGS. 4, 9, and 11, the first hinge member 104 is fixedly secured to the cabinet 52. Moreover, as shown particularly in FIG. 12, the second hinge member 106 includes a base portion 108 and a pin portion 110. Thus, as shown in FIGS. 4, 9, and 11, the base portion 108 is fixedly secured to cover member 100. Accordingly, as generally shown in FIGS. 4-16, the pin portion 110 is rotatably secured to the first hinge member 104 to move the cover member 100 between the open position and the closed position.

In particular embodiments, the first hinge member 104 may be secured to the cabinet 52 using any suitable means, such as, for example, via one or more fasteners or a snap fit. For example, as shown in FIGS. 4, 6, 7, 10, 12, and 14, the first hinge member 104 may include one or more through holes 126 configured to receiving one or more fasteners (not shown). Moreover, in an embodiment, the second hinge member 106 of the hinge assembly 102 may be secured within the cover member 100 using any suitable means, such as, for example, via one or more fasteners, adhesive, a snap fit, or similar. For example, as shown in FIGS. 10, 12, and 14, and 18, the second hinge member 106 may include one or more through holes 126 configured to receiving one or more fasteners (not shown).

As such, in the open position, the first and second hinge members 104, 106 cooperatively engage together to restrict movement of the cover member 100 in the open position. More specifically, in an embodiment, the first and second hinge members 104, 106 cooperatively engage together to prevent the cover member 100 from colliding with the backsplash 56. Further, in the closed position, the cabinet 52 restricts movement of the cover member 100.

More specifically, as shown in FIGS. 11-14, the first hinge member 104 includes a recess 112 for receiving the pin portion 110. In such embodiments, as shown, the pin portion 110 is rotatably secured within the recess 112. Furthermore, as shown particularly in FIGS. 12 and 13, the recess 112 defines a keyway passage 114, whereas the pin portion 110 includes a corresponding key feature 116 that aligns with the keyway passage 114 when an orientation of the key feature 116 is in a predetermined position to allow the pin portion 110 to be inserted into the recess 112 only when oriented in the predetermined position (such as the orientation illustrated in FIGS. 12 and 13). Moreover, in an embodiment, as shown, the key feature 116 may be integral with the pin portion 110 of the second hinge member 106.

Figure 14:
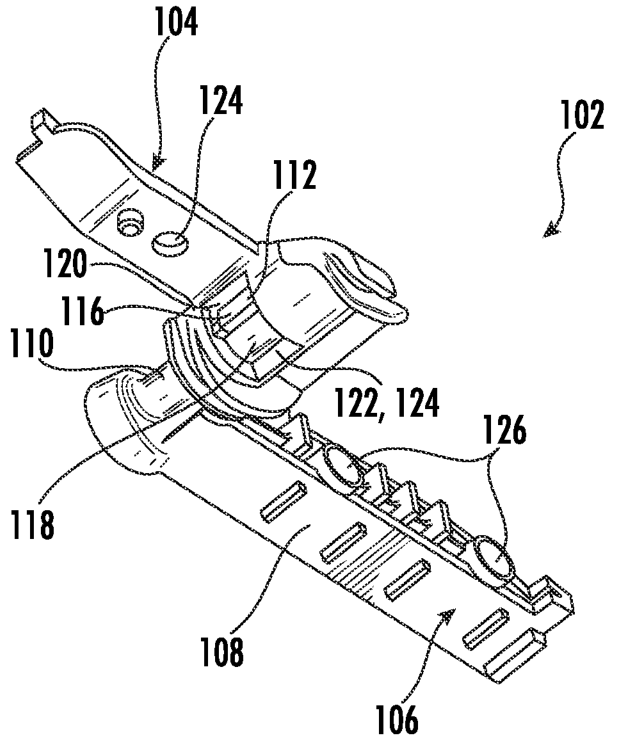
FIG. 14 provides a bottom, perspective view of one embodiment of a hinge assembly of a washing machine appliance in an open position according to the present disclosure.
Figure 15:
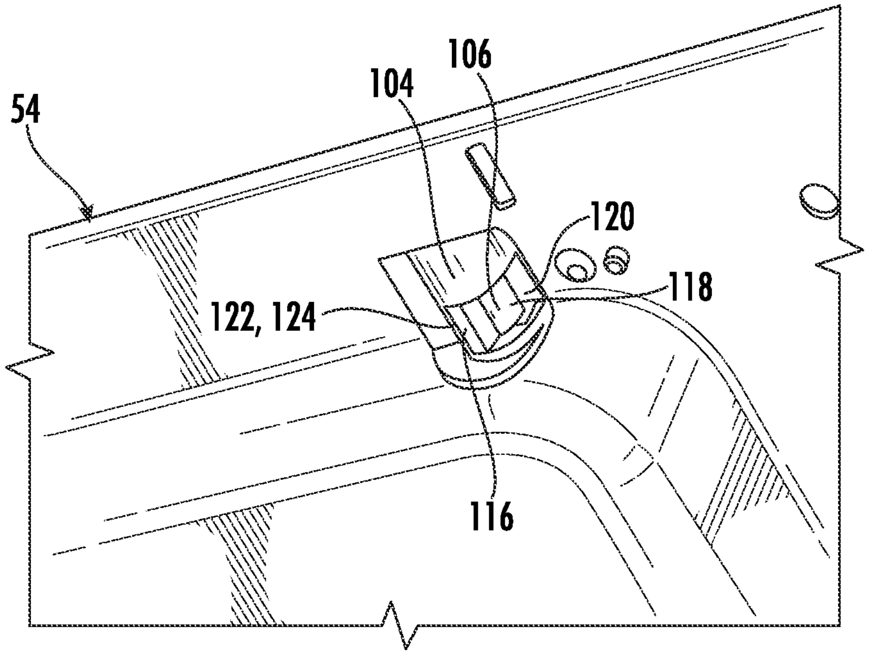
FIG. 15 provides a bottom, perspective view of one embodiment of a washing machine appliance with a hinge assembly thereof in an open position according to the present disclosure.
Figure 16:
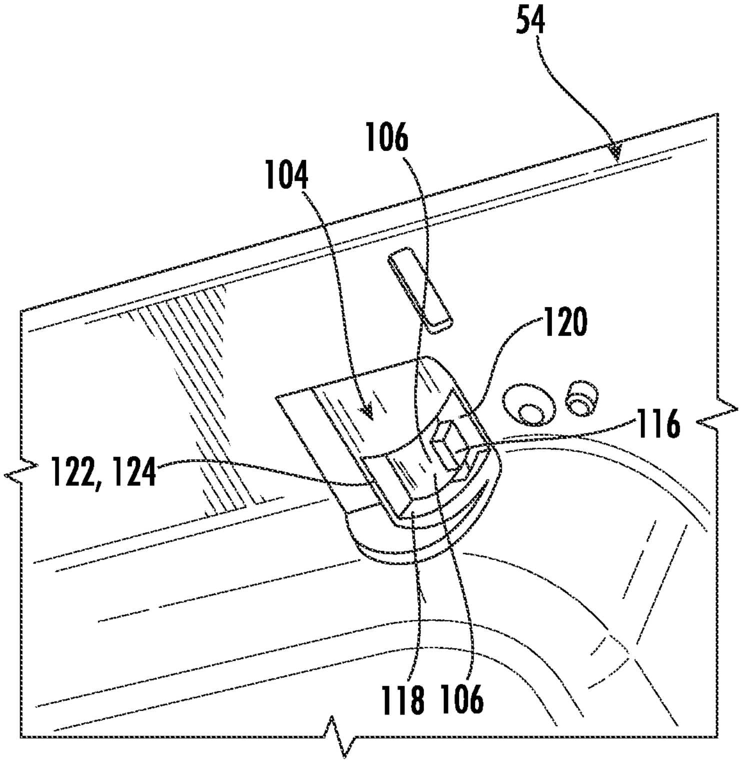
FIG. 16 provides a bottom, perspective view of one embodiment of a washing machine appliance with a hinge assembly thereof in a closed position according to the present disclosure.

In further embodiments, as shown in FIGS. 14-16, the keyway passage 114 of the first hinge member 104 may include an arcuate opening 118 configured to receive the key feature 116. For example, as shown, the arcuate opening 118 may define a rotatable path for limiting movement of the key feature 116 that extends from a first end 120 to a second end 122. Moreover, as shown in FIGS. 14 and 16, the first end 120 is configured for receiving the key feature 116 upon insertion of the pin portion 110 in the predetermined position. Thus, as shown, the predetermined position in each of FIGS. 14 and 16 corresponds to the cover member 100 being in a closed position. Furthermore, as shown in FIG. 15, the second end 122 includes a stop feature 124, such as a wall, for stopping rotation of the key feature 116 within the recess 112, thereby restricting movement of the cover member 100.

Figure 17:
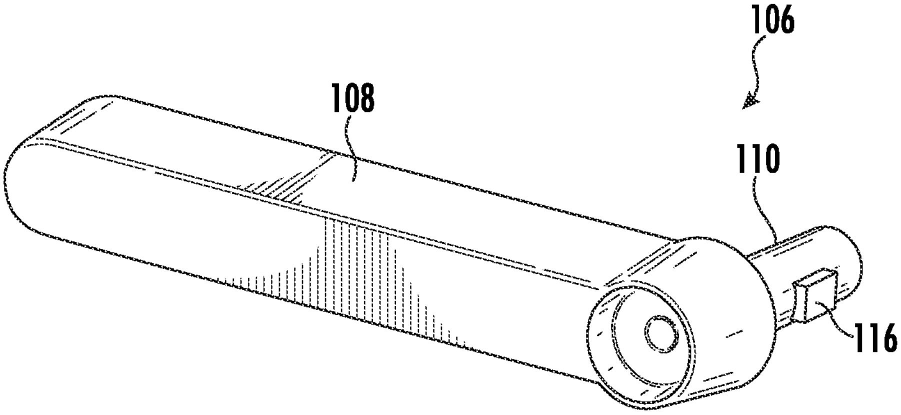
FIG. 17 provides a perspective view of one embodiment of a second hinge member of a hinge assembly of a washing appliance according to the present disclosure.
Figure 18:
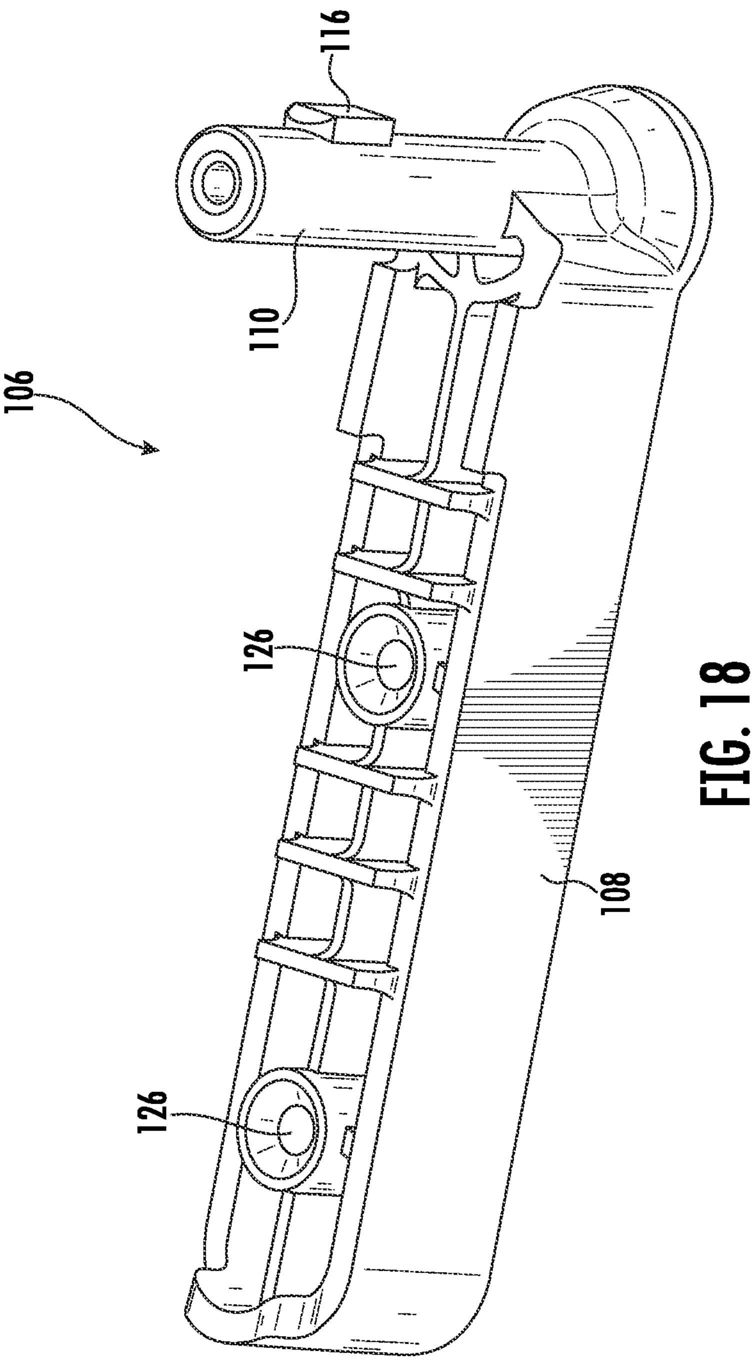
FIG. 18 provides a bottom, perspective view of one embodiment of a second hinge member of a hinge assembly of a washing appliance according to the present disclosure.

Referring now to FIGS. 17 and 18, the second hinge member 106 may be symmetric. In such embodiments, the second hinge member 106 can be easily accommodated into any suitable side of the cover member 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance, comprising:

a cabinet defining at least one chamber accessible via an opening;

a cover member movable between an open position and a closed position for providing selective access to the opening; and a hinge assembly constructed of a polymer material and operably coupled to the cover member, the hinge assembly comprising a first hinge member and a second hinge member rotatable with respect to the first hinge member, the first hinge member fixedly secured to the cabinet, the second hinge member comprising a base portion and a pin portion, the base portion fixedly secured to cover member, the pin portion rotatably secured to the first hinge member to move the cover member between the open position and the closed position, wherein, in the open position, the first and second hinge members cooperatively engage together to restrict movement of the cover member in the open position, and wherein, in the closed position, the cabinet restricts movement of the cover member, wherein the first hinge member comprises a recess, the pin portion being rotatably secured within the recess, wherein the recess defines a keyway passage and the pin portion comprises a corresponding key feature that aligns with the keyway passage when an orientation of the key feature is in a predetermined position to allow the pin portion to be inserted into the recess only when oriented in the predetermined position, and wherein the keyway passage of the first hinge member comprises an arcuate opening receiving the key feature, the arcuate opening defining a rotatable path for the key feature extending from a first end to a second end, the first end configured for receiving the key feature upon insertion of the pin portion in the predetermined position, the second end comprising a stop feature for stopping rotation of the key feature within the recess, thereby restricting movement of the cover member, and wherein the key feature extends parallel with a longitudinal axis of the cover member in both the open and closed positions of the cover member.

2. The appliance of claim 1, further comprising a backsplash, wherein, in the open position, the first and second hinge members cooperatively engage together to prevent the cover member from colliding with the backsplash.

3. The appliance of claim 2, wherein the backsplash comprises one or more controls of the appliance.

4. The appliance of claim 1, wherein the key feature is integral with pin portion of the second hinge member.

5. The appliance of claim 1, wherein the second hinge member of the hinge assembly is secured within the cover member via at least one of one or more fasteners, adhesive, or a snap fit.

6. The appliance of claim 1, wherein the first hinge member is secured to the cabinet of the appliance via at least one of one or more fasteners or a snap fit.

7. The appliance of claim 1, wherein the second hinge member is symmetric.

8. The appliance of claim 1, wherein the appliance is a washing machine appliance comprising, at least, a tub, a basket rotatably mounted within the tub, and a motor in mechanical communication with the basket, the motor configured for selectively rotating the basket within the tub.

9. The appliance of claim 8, wherein the opening is one of a top opening of the washing machine appliance and the cover member is a top lid of the washing machine appliance.

10. The appliance of claim 1, wherein the appliance is a dryer appliance.

11. A washing machine appliance, comprising:

a tub;

a basket rotatably mounted within the tub, the basket comprising a cabinet defining at least one chamber accessible via an opening for receipt of articles for washing;

a cover member movable between an open position and a closed position for providing selective access to the opening; and a hinge assembly constructed of a polymer material and operably coupled to the cover member, the hinge assembly comprising a first hinge member and a second hinge member rotatable with respect to the first hinge member, the first hinge member fixedly secured to the cabinet, the second hinge member comprising a base portion and a pin portion, the base portion fixedly secured to cover member, the pin portion rotatably secured to the first hinge member to move the cover member between the open position and the closed position, wherein, in the open position, the first and second hinge members cooperatively engage together to restrict movement of the cover member in the open position, and wherein, in the closed position, the cabinet restricts movement of the cover member, wherein the first hinge member comprises a recess, the pin portion being rotatably secured within the recess, wherein the recess defines a keyway passage and the pin portion comprises a corresponding key feature that aligns with the keyway passage when an orientation of the key feature is in a predetermined position to allow the pin portion to be inserted into the recess only when oriented in the predetermined position, and wherein the keyway passage of the first hinge member comprises an arcuate opening receiving the key feature, the arcuate opening defining a rotatable path for the key feature extending from a first end to a second end, the first end configured for receiving the key feature upon insertion of the pin portion in the predetermined position, the second end comprising a stop feature for stopping rotation of the key feature within the recess, thereby restricting movement of the cover member, and wherein the key feature extends parallel with a longitudinal axis of the cover member in both the open and closed positions of the cover member.

12. The washing machine appliance of claim 11, further comprising a backsplash, wherein, in the open position, the first and second hinge members cooperatively engage together to prevent the cover member from colliding with the backsplash.

13. The washing machine appliance of claim 11, wherein the key feature is integral with pin portion of the second hinge member.

14. The washing machine appliance of claim 11, wherein the second hinge member is symmetric such that the hinge assembly can be secured to any side of the cabinet.

* * * * *